US012172246B2

(12) United States Patent
Ono et al.

(10) Patent No.: US 12,172,246 B2
(45) Date of Patent: Dec. 24, 2024

(54) SENSOR PROTECTING CASE, IMAGING DEVICE, WELDING SYSTEM, COOLING METHOD FOR SENSOR, AND COOLING CONTROL METHOD FOR SENSOR

(71) Applicant: Kobe Steel, Ltd., Kobe (JP)

(72) Inventors: Junichi Ono, Fujisawa (JP); Naohide Furukawa, Fujisawa (JP); Keito Ishizaki, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 142 days.

(21) Appl. No.: 18/006,162

(22) PCT Filed: Sep. 3, 2021

(86) PCT No.: PCT/JP2021/032560
§ 371 (c)(1),
(2) Date: Jan. 20, 2023

(87) PCT Pub. No.: WO2022/074982
PCT Pub. Date: Apr. 14, 2022

(65) Prior Publication Data
US 2023/0294193 A1    Sep. 21, 2023

(30) Foreign Application Priority Data
Oct. 5, 2020   (JP) .................................. 2020-168540

(51) Int. Cl.
*B23K 9/095* (2006.01)
*G03B 17/08* (2021.01)
(Continued)

(52) U.S. Cl.
CPC ............ *B23K 9/0956* (2013.01); *G03B 17/08* (2013.01); *G03B 17/55* (2013.01); *G03B 17/56* (2013.01)

(58) Field of Classification Search
None
See application file for complete search history.

(56) References Cited

U.S. PATENT DOCUMENTS

2007/0206942 A1*  9/2007  Gyde Heaven ........ H04N 23/51
                                                      348/E5.026
2018/0231875 A1*  8/2018  Zanganeh .............. G03B 15/00

FOREIGN PATENT DOCUMENTS

CN     218037653 U  * 12/2022
CN     219590648 U  *  8/2023
(Continued)

OTHER PUBLICATIONS

International Search Report mailed on Nov. 22, 2021 in PCT/JP2021/032560 filed on Sep. 3, 2021 (2 pages).

*Primary Examiner* — Rodney E Fuller
(74) *Attorney, Agent, or Firm* — Oblon, McClelland, Maier & Neustadt, L.L.P.

(57) ABSTRACT

A sensor protecting case is provided with a case main body for housing a sensor main body and a sensor input portion, and a centralized cooling portion that is partitioned off by a partition so as to include at least part of the sensor input portion, and constitutes an independent space within the case main body. The case main body has a first gas inflow port for causing gas to flow into the case main body, and a first gas outflow port for causing the gas to flow out of the case main body. The partition has a second gas inflow port that is connected to the first gas inflow port to cause the gas to flow into the centralized cooling portion, and a second gas outflow port for causing the gas to flow out of the centralized cooling part into the case main body.

23 Claims, 8 Drawing Sheets

(51) Int. Cl.
    *G03B 17/55*           (2021.01)
    *G03B 17/56*           (2021.01)

(56)           References Cited

FOREIGN PATENT DOCUMENTS

| | | | |
|---|---|---|---|
| JP | 2020-42241 A | | 3/2020 |
| KR | 20220032950 A | * | 3/2002 |

* cited by examiner

SENSOR PROTECTING CASE, IMAGING DEVICE, WELDING SYSTEM, COOLING METHOD FOR SENSOR, AND COOLING CONTROL METHOD FOR SENSOR

TECHNICAL FIELD

The present invention relates to a sensor protecting case, an imaging device, a welding system, a cooling method for a sensor, and a cooling control method for a sensor.

BACKGROUND ART

Non-consumable electrode type or consumable electrode type gas-shielded arc welding is used to weld a structure including, as a base material, metal or nonferrous metal, for example. Such a welding method typically uses a welding torch to generate an arc between the electrode and a target object to be welded (hereinafter, also referred to as a "workpiece"), melt the target object with heat while forming a molten pool, and perform welding. During welding, the atmosphere is blocked by using a shielding gas.

In this gas-shielded arc welding, a weld condition, such as arc stability or metal transfer, changes due to, for example, the shape of a target object and disturbance during welding. Such a change significantly affects the quality of welding. For this reason, typically, welding is performed while a weld condition is being observed through a sensor. The weld condition is recorded, or alternatively, welding conditions are controlled. In general, a sensor that is used for observing a weld condition is often positioned near a welding heat source, such as an arc, and often includes a cooling mechanism because the performance or service life of the sensor may be significantly affected by the welding heat source.

For example, PTL 1 discloses a welding imaging device that includes: a camera unit including a camera main body and a lens barrel removably attached to the camera main body; and a camera case including a case main body housing the camera main body and a lens cover removably attached to the case main body while covering the lens barrel, and that captures an image of a condition during welding. The welding imaging device includes a camera cooling mechanism that cools the camera unit by causing cooling gas to flow through the inside of the camera case.

CITATION LIST

Patent Literature

PTL 1: Japanese Unexamined Patent Application Publication No. 2020-42241

SUMMARY OF INVENTION

Technical Problem

Examples of major factors that increase the temperature of a sensor used to observe a weld condition include radiant heat due to thermal energy generated during welding and heat generated from the sensor. The welding imaging device disclosed in PTL 1 includes the camera cooling mechanism for cooling the camera unit, but any consideration is not given to cooling against radiant heat due to thermal energy generated during welding.

In response to the above issue, it is an object of the present invention to provide a sensor protecting case, an imaging device, a welding system, a sensor cooling method, and a sensor cooling control method that are capable of locally cooling a sensor input portion that is close to a welding heat source and is significantly affected by radiant heat, and capable of effectively cooling even a sensor main body.

Solution to Problem

The above object of the present invention is achieved by the following configuration [1] or [2] for a sensor protecting case.

[1] A sensor protecting case capable of housing a sensor that is used for observing a weld condition or for controlling welding and that includes a sensor main body and a sensor input portion, the sensor protecting case including:
a case main body for housing the sensor main body and the sensor input portion; and
a centralized cooling portion that is partitioned off by a partition so as to include at least part of the sensor input portion and constitutes an independent space within the case main body,
the case main body having at least one first gas inflow port for causing gas to flow into the case main body and at least one first gas outflow port for causing the gas to flow out of the case main body,
the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body.

[2] A sensor protecting case capable of housing a sensor that is used for observing a weld condition or for controlling welding and that includes a sensor main body and a sensor input portion, the sensor protecting case including:
a case main body for housing the sensor main body and the sensor input portion;
a first centralized cooling portion that is partitioned off by a first partition so as to include at least part of the sensor input portion and constitutes an independent space within the case main body; and
a second centralized cooling portion that is partitioned off by a second partition so as to include at least part of the sensor main body and constitutes an independent space within the case main body,
the case main body having at least one first gas inflow port for causing gas to flow into the case main body and at least one first gas outflow port for causing the gas to flow out of the case main body,
the first partition having at least one second gas inflow port that is directly or indirectly connected to the first gas inflow port in order to cause the gas to flow into the first centralized cooling portion and at least one second gas outflow port for causing the gas to flow out of the first centralized cooling portion to the second centralized cooling portion,
the second partition having at least one fourth gas inflow port that is directly or indirectly connected to the second gas outflow port in order to cause the gas to flow into the second centralized cooling portion and at least one fourth gas outflow port for causing the gas to flow out of the second centralized cooling portion into the case main body.

The above object of the present invention is achieved by the following configuration [3] for an imaging device.

[3] An imaging device including:
- a visual sensor that is used for observing a weld condition or for controlling welding;
- the sensor protecting case according to [1] or [2] capable of housing the visual sensor; and
- a gas cooling device configured to cool gas that is caused to flow into the sensor protecting case.

The above object of the present invention is achieved by the following configuration [4] for a welding system.

[4] A welding system including the imaging device according to [3], a welding apparatus, a controller, and a welding power supply,
- the imaging device being disposed near a welding torch included in the welding apparatus and configured to obtain welding information,
- the welding apparatus including an apparatus control unit configured to control parts of the welding apparatus,
- the controller being configured to output the welding information inputted from the imaging device to the welding power supply and the apparatus control unit.

The above object of the present invention is achieved by the following configuration [5] for a cooling method for a sensor.

[5] A sensor cooling method for cooling a sensor by using a sensor protecting case capable of housing the sensor, the sensor being used for observing a weld condition or for controlling welding and including a sensor main body and a sensor input portion,
the sensor protecting case including
- a case main body for housing the sensor main body and the sensor input portion, and
- a centralized cooling portion that is partitioned off by a partition so as to include at least part of the sensor input portion and constitutes an independent space within the case main body,
the case main body having at least one first gas inflow port for causing gas to flow into the case main body and at least one first gas outflow port for causing the gas to flow out of the case main body,
the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body,
the method including:
causing a total flow rate of the gas supplied to the first gas inflow port to range from 100 to 200 L/min.

The above object of the present invention is achieved by the following configuration [6] for a cooling control method for a sensor.

[6] A sensor cooling control method for cooling a sensor by using a sensor protecting case capable of housing the sensor and a controller including a temperature control unit, the sensor being used for observing a weld condition or for controlling welding and including a sensor main body and a sensor input portion,
the sensor protecting case including
- a case main body for housing the sensor main body and the sensor input portion,
- a centralized cooling portion that is partitioned off by a partition so as to include at least part of the sensor input portion and constitutes an independent space within the case main body, and
- a temperature sensor configured to measure a temperature of the sensor,
the case main body having at least one first gas inflow port for causing gas to flow into the case main body and at least one first gas outflow port for causing the gas to flow out of the case main body,
the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body,
the temperature control unit being configured to receive temperature information on the temperature of the sensor measured by the temperature sensor,
the method including:
- a sensor temperature control step of controlling, through the temperature control unit, cooling information on the gas based on the temperature information; and
- a temperature management step of generating, through the temperature control unit, an alarm in response to the temperature control unit determining that the temperature information exceeds a predetermined threshold value,
wherein the sensor temperature control step or the temperature management step is performed after the temperature control unit receives the temperature information.

Advantageous Effects of Invention

The sensor protecting case, the imaging device, the welding system, the sensor cooling method, and the sensor cooling control method according to the present invention enable a portion close to a welding heat source, or a portion where the amount of heat is particularly large due to radiant heat, for example, the sensor input portion, to be locally cooled with the gas and also enable the sensor main body to be effectively cooled.

DESCRIPTION OF EMBODIMENTS

Embodiments of a sensor protecting case, an imaging device, a welding system, a sensor cooling method, and a sensor cooling control method according to the present invention will be described below in detail with reference to the drawings. In the following description, an imaging device through which, for example, the shape of a workpiece or a weld condition can be observed, or more specifically, a visual sensor, such as a camera, will be described as an exemplary sensor. The sensor is not particularly limited to the visual sensor.

Sensor Unit

First to fifth embodiments of a sensor unit including an imaging device and a sensor protecting case will be described sequentially.

First Embodiment

Figure 1:
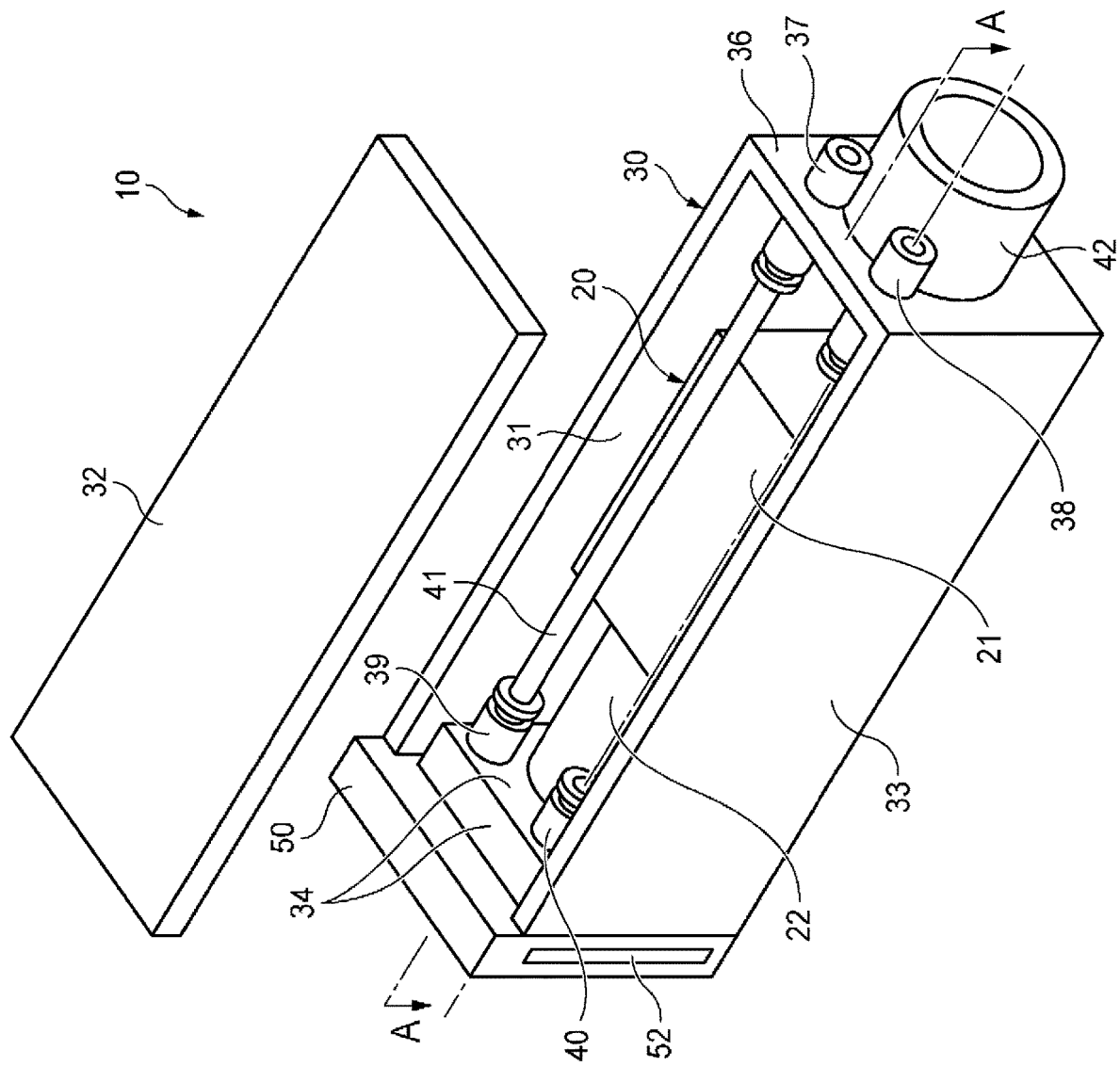
FIG. 1 is a partially exploded, perspective view of a sensor unit according to a first embodiment of the present invention.
Figure 2:
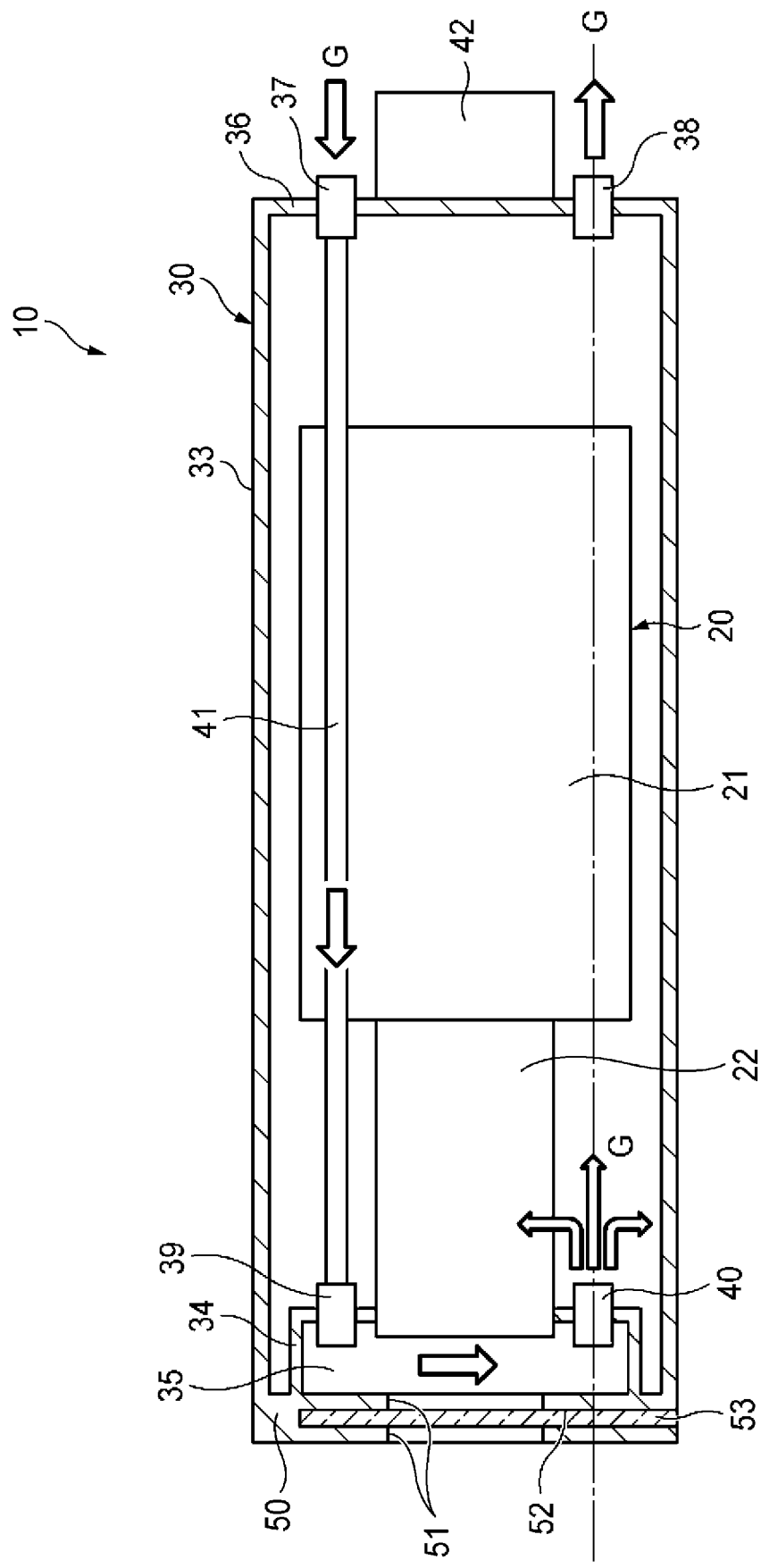
FIG. 2 is a sectional view of the sensor unit of FIG. 1 taken along line A-A.
Figure 3:
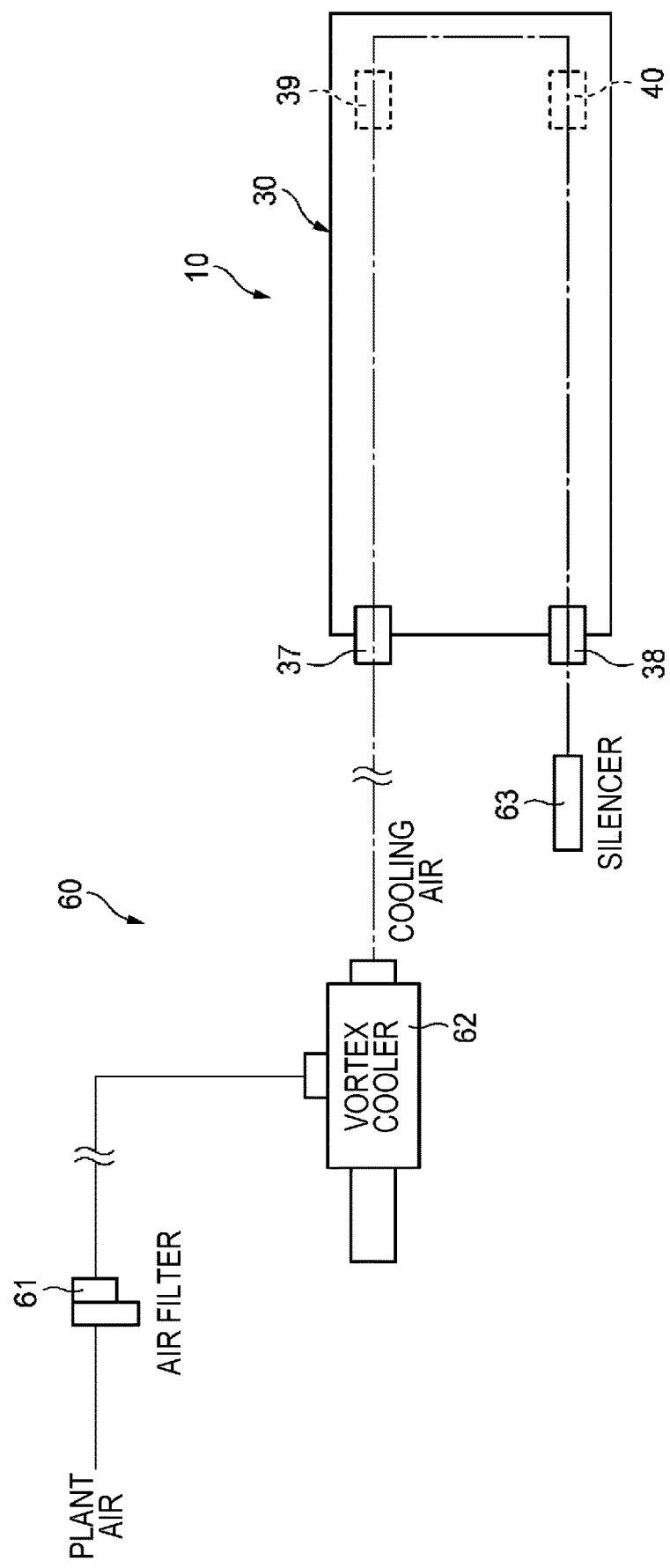
FIG. 3 is a schematic diagram illustrating a gas supply mechanism that supplies gas to the sensor unit of FIG. 1.

A sensor unit according to a first embodiment of the present invention will be described with reference to FIGS. 1 to 3. FIG. 1 is a partially exploded, perspective view of the sensor unit according to the first embodiment. FIG. 2 is a sectional view of the sensor unit of FIG. 1 taken along line A-A. FIG. 3 is a schematic diagram illustrating a gas supply mechanism that supplies gas to the sensor unit of FIG. 1.

As illustrated in FIGS. 1 and 2, a sensor unit 10 includes an imaging device 20, such as a camera, and a sensor protecting case 30 housing the imaging device 20. The imaging device 20 includes a camera main body 21, which is a sensor main body, and a lens 22, which is a sensor input portion, attached to a front end of the camera main body 21. The imaging device 20 is disposed near a weld and obtains various pieces of welding information that are used for observing a weld condition or for controlling welding. The imaging device 20, particularly, the lens 22 disposed near a weld tends to increase in temperature due to radiant heat from the weld.

The sensor protecting case 30 includes a case main body 33, which is a hollow case having a substantially rectangular cuboid shape and an opening 31 at one surface (upper surface in FIG. 1), and further includes a lid 32, which closes the opening 31. The sensor protecting case 30 further includes a centralized cooling portion 35, which is partitioned off by a partition 34 in the case main body 33 and constitutes an independent space within the case main body 33. Although the centralized cooling portion 35 does not necessarily need to be a hermetic space as long as the centralized cooling portion 35 constitutes an independent space within the case main body 33, the inside of the centralized cooling portion 35 is preferably a hermetic space because a hermetic space in the centralized cooling portion 35 can further enhance a cooling effect in the centralized cooling portion 35.

The case main body 33 houses the camera main body 21, which is the sensor main body, and the lens 22, which is the sensor input portion. Furthermore, the centralized cooling portion 35 houses part of the lens 22 (in FIG. 1, a front end of the lens) that protrudes into the centralized cooling portion 35 from the partition 34. The camera main body 21 includes an imaging element, such as a charge-coupled device (CCD) or a complementary metal-oxide-semiconductor (CMOS) sensor. The imaging element converts received light corresponding to an image into an electrical signal and outputs the electrical signal.

The case main body 33 includes a rear wall 36 having a first gas inflow port 37 for causing gas G supplied from the outside of the case main body 33 to flow into the case main body 33 and a first gas outflow port 38 for causing the gas G to flow out of the case main body 33 after cooling the imaging device 20. The first gas inflow port 37 and the first gas outflow port 38 extend through the rear wall 36.

The rear wall 36 of the case main body 33 further has a connection terminal 42 for, for example, output of an image signal obtained through the imaging device 20 and other signals, power supply to the imaging device 20, and input of a control signal to the imaging device 20.

Furthermore, the partition 34, which defines the centralized cooling portion 35, has a second gas inflow port 39 for causing the gas G that has entered the case main body 33 to flow into the centralized cooling portion 35 and a second gas outflow port 40 for causing the gas G that has entered the centralized cooling portion 35 to flow out of the centralized cooling portion 35 into the case main body 33.

The first gas inflow port 37 is directly or indirectly connected to the second gas inflow port 39. The first embodiment in FIGS. 1 and 2 illustrates an example in which the first gas inflow port 37 is indirectly connected to the second gas inflow port 39 by a pipe 41. An example in which the first gas inflow port 37 is directly connected to the second gas inflow port 39 will be described in a second embodiment illustrated in FIG. 4.

The gas G supplied to the sensor protecting case 30 through the first gas inflow port 37 is supplied to the centralized cooling portion 35 through the pipe 41 and the second gas inflow port 39, thus locally cooling the lens 22, which is the sensor input portion. After that, the gas G is discharged into the case main body 33 through the second gas outflow port 40. The gas G cools the camera main body 21, and is then discharged from the case main body 33 to the outside through the first gas outflow port 38.

The above-described configuration enables a portion close to a welding heat source, or a portion where the amount of heat is particularly large due to radiant heat, for example, the lens 22 being the sensor input portion, to be locally cooled with the gas G and also enables the camera main body 21, which is the sensor main body, to be effectively cooled.

Furthermore, the first gas outflow port 38 and the second gas outflow port 40 are arranged such that an ejection direction of the gas G at the second gas outflow port 40 is substantially aligned with an ejection direction of the gas G at the first gas outflow port 38. The camera main body 21, which is the sensor main body, is disposed between the first gas outflow port 38 and the second gas outflow port 40. Thus, at least part of the camera main body 21 is located in the flow of the gas G from the second gas outflow port 40 to the first gas outflow port 38, so that the camera main body 21 can be efficiently cooled.

The first gas outflow port 38 or the second gas outflow port 40 is preferably provided with at least one of an air filter, a fan, or a silencer. Such a configuration promotes the flow of the gas G, thus improving cooling capacity and reducing noise that is generated while the gas G is flowing through the outflow port.

For the centralized cooling portion 35, preferably, the second gas inflow port 39 has an area S1, or more specifically, an actual cross-sectional area S1 ranging from 7.0 to 25.0 mm$^2$, the second gas outflow port 40 has an area S2, or more specifically, an actual cross-sectional area S2 ranging from 2.0 to 15.0 mm$^2$, and the ratio, S2/S1, of the area S2 of the second gas outflow port 40 to the area S1 of the second gas inflow port 39 ranges from 0.30 to 1.00. This allows appropriate control of a flow rate or flow velocity of the gas G flowing through the centralized cooling portion 35, thus effectively cooling the lens 22, which is the sensor input portion and tends to increase in temperature.

For more effective cooling of the lens 22, preferably, the actual cross-sectional area S1 of the second gas inflow port 39 ranges from 8.0 to 21.0 mm$^2$, the actual cross-sectional area S2 of the second gas outflow port 40 ranges from 3.0 to 14.0 mm$^2$, and the above-described ratio S2/S1 ranges from 0.45 to 0.80. Still more preferably, the actual cross-sectional area S1 of the second gas inflow port 39 ranges from 9.6 to 19.6 mm$^2$, the actual cross-sectional area S2 of the second gas outflow port 40 ranges from 4.9 to 12.6 mm$^2$, and the above-described ratio S2/S1 ranges from 0.51 to 0.64.

Each of the area of the second gas inflow port 39 and the area of the second gas outflow port 40 is preferably defined as an effective cross-sectional area. In this case, preferably, the second gas inflow port 39 has an effective cross-sectional area A1 ranging from 3.0 to 10.0 mm$^2$, the second gas outflow port 40 has an effective cross-sectional area A2 ranging from 1.5 to 7.5 mm$^2$, and the ratio, A2/A1, of the effective cross-sectional area A2 of the second gas outflow port 40 to the effective cross-sectional area A1 of the second gas inflow port 39 ranges from 0.40 to 1.00.

For more effective cooling of the lens 22, the effective cross-sectional area A1 of the second gas inflow port 39 ranges from 4.0 to 9.0 mm$^2$, the effective cross-sectional area A2 of the second gas outflow port 40 ranges from 2.5 to 5.5 mm$^2$, and the above-described ratio A2/A1 ranges more preferably from 0.50 to 0.70, still more preferably from 0.60 to 0.65.

The centralized cooling portion 35 has a front wall 50 having an aperture 51, through which a weld condition can be observed, aligned with the optical axis of the lens 22. The front wall 50 has a side having a slit 52, which has a rectangular cross-sectional shape. The slit 52 holds a protective glass plate 53 for protecting the lens 22 from foreign matter, such as spatter that is generated during welding.

In FIG. 2, a wall, serving as a portion of the front wall 50, is located between the protective glass plate 53 and the centralized cooling portion 35. The protective glass plate 53 may directly face the centralized cooling portion 35 such that the wall is not interposed therebetween.

FIG. 3 is a schematic diagram illustrating a gas supply mechanism for cooling the gas to be supplied to the sensor unit. As illustrated in FIG. 3, a gas supply mechanism 60 includes an air filter 61 and a vortex cooler 62, which is a gas cooling device. Compressed gas, such as plant air or compressed air supplied from a compressed-air supply source, is filtered with the air filter 61, thus removing foreign matter. After that, the gas is cooled to a predetermined temperature in the vortex cooler 62 and is then supplied as cooling air to the sensor protecting case 30 through the first gas inflow port 37.

The total flow rate of the gas G supplied to the first gas inflow port 37 preferably ranges from 100 to 200 L/min. The total flow rate of the gas G ranging from 100 to 200 L/min provides a sufficient effect of suppressing an increase in temperature, thus efficiently cooling the sensor main body and the sensor input portion.

Again referring to FIGS. 1 and 2, the gas G supplied to the first gas inflow port 37 is guided to the second gas inflow port 39 through the pipe 41 and is supplied to the centralized cooling portion 35. The lens 22, which is the sensor input portion and tends to increase in temperature due to radiant heat from a weld, is efficiently cooled with the gas G flowing at a high velocity.

After cooling the lens 22, the gas G flows into the case main body 33 through the second gas outflow port 40, cools the sensor main body 21 housed in the case main body 33, and is then discharged from the sensor protecting case 30 to the outside through the first gas outflow port 38.

For the gas G, air, nitrogen gas, inert gas, carbonic acid gas, or a mixture of these gases can be used. A shielding gas used for welding may also be used.

As illustrated in FIG. 3, a silencer 63 disposed at the first gas outflow port 38 can reduce or eliminate exhaust noise, so that the gas supply mechanism 60 can be operated quietly. The first gas outflow port 38 or the second gas outflow port 40 may be provided with an air filter (not illustrated) or a fan (not illustrated). Furthermore, the first gas inflow port 37 or the second gas inflow port 39 may be provided with an air filter or a dehumidifier in order to prevent dust or moisture from entering the case main body 33 or the centralized cooling portion 35, thus further improving cooling efficiency.

The sensor protecting case 30, which is affected by radiant heat from a weld, is preferably made of a highly heat-resistant material, such as a heat-resistant, flame-retardant resin. The sensor protecting case 30 may be made of highly heat-conductive, light-weight nonferrous metal, such as aluminum alloy or magnesium alloy, or metal. Furthermore, the sensor protecting case 30 preferably has a substantially white color that highly efficiently reflects radiant heat.

As illustrated in FIGS. 1 to 3, in the present embodiment described above, each of the first gas inflow port 37, the first gas outflow port 38, the second gas inflow port 39, and the second gas outflow port 40 is a single port. Each port may include a plurality of ports. In the case where the first gas inflow port 37 includes a plurality of ports, the above-described total flow rate of the gas G supplied to the first gas inflow port 37 means the sum of the flow rates of the gas G supplied to the respective first gas inflow ports 37.

Second Embodiment

Figure 4:
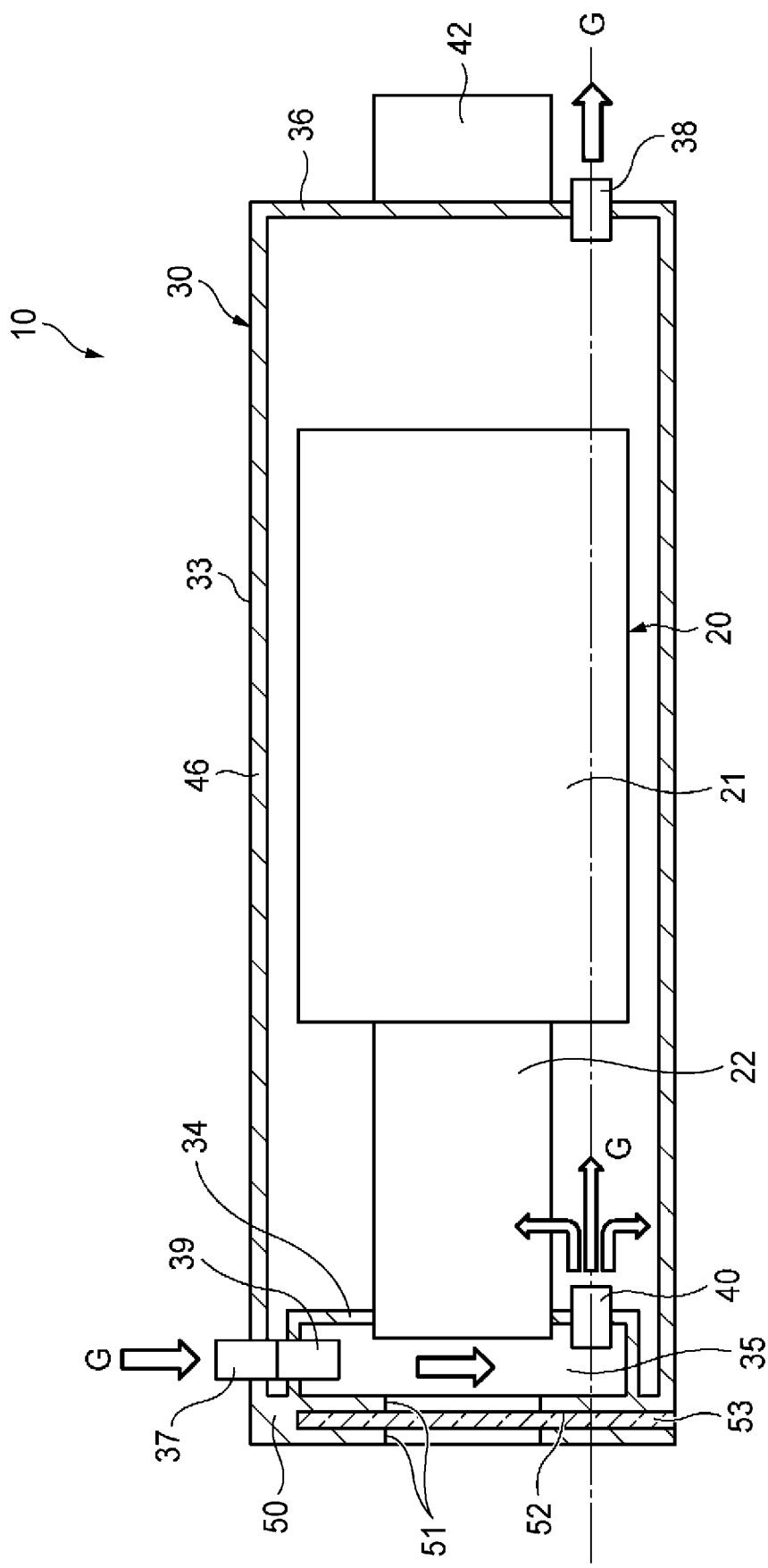
FIG. 4 is a transverse sectional view of a sensor unit according to a second embodiment of the present invention.

A sensor unit according to a second embodiment of the present invention will be described with reference to FIG. 4. FIG. 4 is a transverse sectional view of the sensor unit according to the second embodiment. The sensor unit 10 according to the present embodiment has an exemplary configuration in which the first gas inflow port 37 is directly connected to the second gas inflow port 39.

The first gas inflow port 37 extends through a side wall 46 of the case main body 33 and protrudes from the side wall 46 so as to directly communicate with the centralized cooling portion 35. Such a configuration reduces a path for the gas G to be supplied to the centralized cooling portion 35, thus improving the cooling efficiency in the centralized cooling portion 35.

The rest of the configuration is the same as that of the sensor unit according to the above-described first embodiment. The same components or parts are designated by the same or similar reference signs, and the description thereof is simplified or omitted. In the following embodiments, changes will be mainly described. The same components are designated by the same or similar reference signs, and the description thereof will be simplified or omitted.

Third Embodiment

Figure 5:
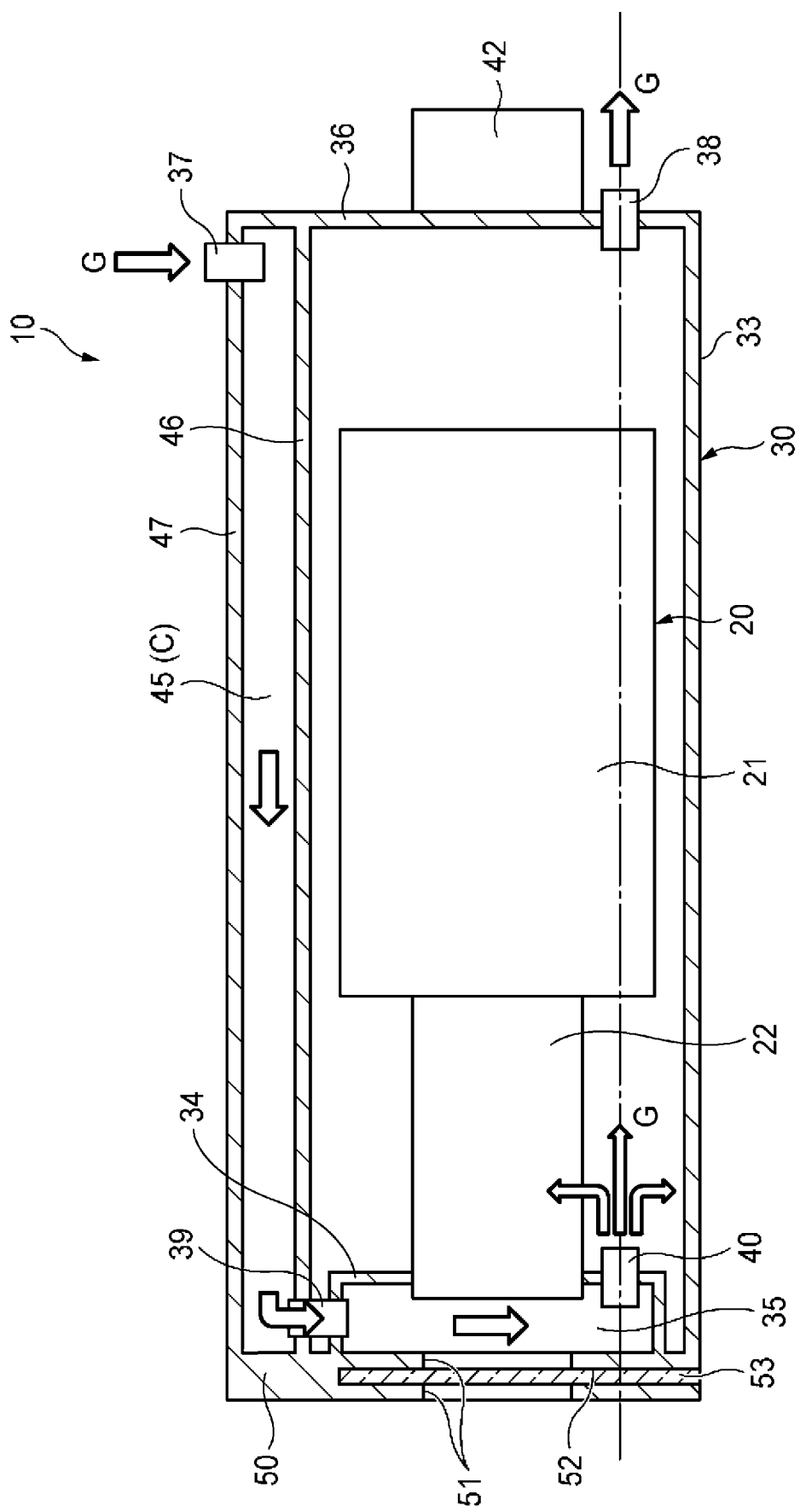
FIG. 5 is a transverse sectional view of a sensor unit according to a third embodiment of the present invention.

A sensor unit according to a third embodiment of the present invention will be described with reference to FIG. 5. FIG. 5 is a transverse sectional view of the sensor unit according to the third embodiment. The sensor unit 10 according to the present embodiment has an exemplary configuration in which the first gas inflow port 37 is indirectly connected to the second gas inflow port 39.

Specifically, a gas passage 45 connecting the first gas inflow port 37 to the second gas inflow port 39 is defined by a gap C formed between the side wall 46 of the sensor protecting case 30 and a second side wall 47 extending along and parallel to the side wall 46. In other words, the side wall 46 of the sensor protecting case 30 and the second side wall 47 provide a double structure having the gap C between the side walls.

As described above, the gas passage 45 is located in the double structure extending along the side wall 46 of the sensor protecting case 30. The gas G is caused to flow through the gas passage 45, thus cooling the sensor protecting case 30. This enhances the cooling efficiency in the entire sensor unit 10.

A wall of the sensor protecting case 30 that has the double structure is preferably positioned to face a weld. This inhibits the sensor protecting case 30 from increasing in temperature due to radiant heat.

In the present embodiment, the gap C is connected to the first gas inflow port 37 and the second gas inflow port 39. As illustrated in a fourth embodiment, which will be described later, a configuration in which the gap C is connected to a third gas inflow port 71 and a third gas outflow port 72 may also be used.

Fourth Embodiment

Figure 6:
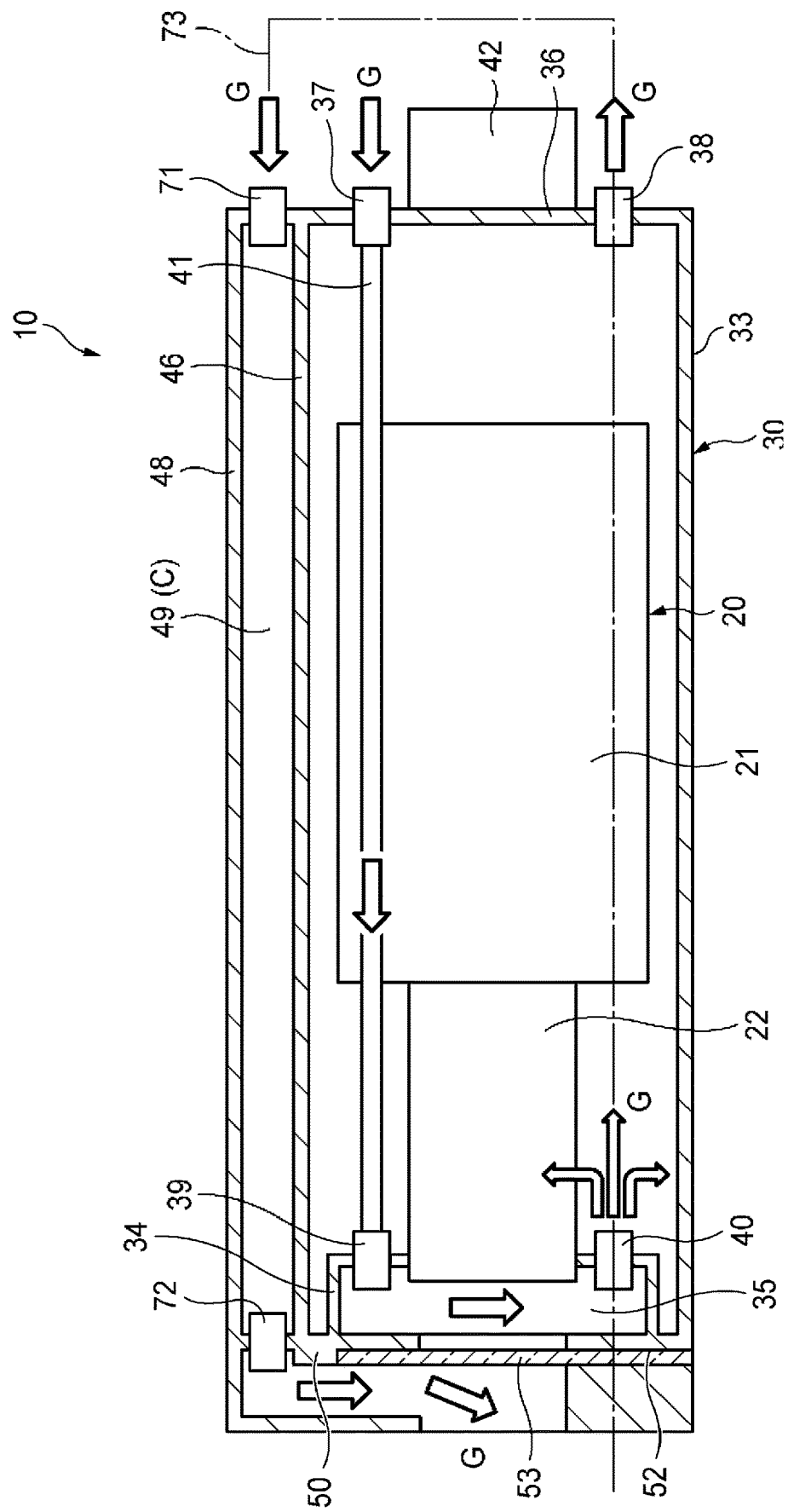
FIG. 6 is a transverse sectional view of a sensor unit according to a fourth embodiment of the present invention.

A sensor unit according to the fourth embodiment of the present invention will be described with reference to FIG. 6. FIG. 6 is a transverse sectional view of the sensor unit according to the fourth embodiment. The sensor unit 10 according to the present embodiment includes the sensor protecting case 30 including a third side wall 48, which has a substantially L-shaped cross-sectional shape and extends along the side wall 46 and the front wall 50 of the centralized cooling portion 35. The side wall 46, the front wall 50, and the third side wall 48 form a substantially L-shaped gap C, which defines a substantially L-shaped gas passage 49.

The third gas inflow port 71 is located at one end of the gas passage 49 that is adjacent to the rear wall 36 of the case main body 33. The third gas outflow port 72 is located at the other end of the gas passage 49 adjacent to the front wall 50. The gas G supplied from the gas supply source (not illustrated) is supplied to the gas passage 49 through the third gas inflow port 71 and is discharged to one of the walls included in the case main body 33 that faces the lens 22, which is the sensor input portion, or the protective glass plate 53 located at the front of the centralized cooling portion 35, thus forming an air curtain in front of the protective glass plate 53.

Such an air curtain formed by the gas G protects and cools the protective glass plate 53, and the gas G supplied to the centralized cooling portion 35 through the second gas inflow port 39 further cools the lens 22, which is the input portion of the imaging device 20. This allows the sensor unit 10 to be effectively cooled. Additionally, this inhibits deposition of fumes and spatter on the wall facing the lens 22.

The total flow rate of the gas G supplied to the third gas inflow port 71 preferably ranges from 100 to 200 L/min. The total flow rate of the gas G ranging from 100 to 200 L/min allows the air curtain to effectively protect the wall facing the lens 22 and also provides the sufficient effect of suppressing an increase in temperature, thus reducing the influence of radiant heat on the lens 22.

The air curtain is preferably blown in a direction away from a weld. This reduces the influence of the gas G forming the air curtain on operation of the shielding gas. Furthermore, although the third gas inflow port 71 and the third gas outflow port 72 may be arranged inside the sensor protecting case 30 as illustrated in FIG. 6, these ports may be independently arranged outside the sensor protecting case 30.

Furthermore, the first gas outflow port 38 may be directly or indirectly connected to the third gas inflow port 71 by a connection path 73, which is indicated by a broken line in FIG. 6, such that the gas G used to cool the imaging device 20 is discharged through the third gas outflow port 72 toward the protective glass plate 53 located at the front of the centralized cooling portion 35 in order to form an air curtain in front of the protective glass plate 53. Thus, the gas G for cooling and the gas G for forming the air curtain can be reused, so that the gas G can be effectively used.

Fifth Embodiment

Figure 7:
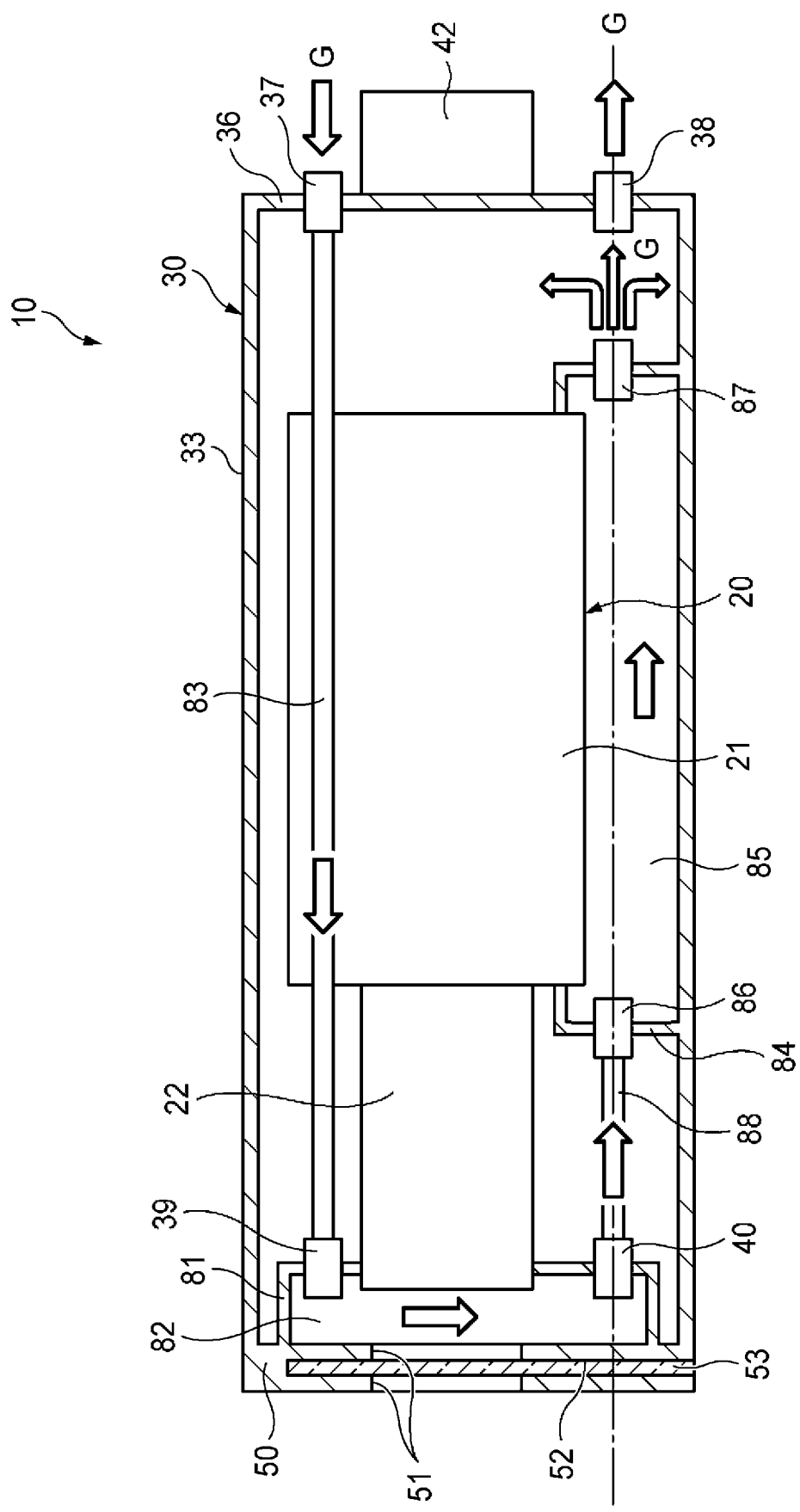
FIG. 7 is a transverse sectional view of a sensor unit according to a fifth embodiment of the present invention.

A sensor unit according to a fifth embodiment of the present invention will be described with reference to FIG. 7. FIG. 7 is a transverse sectional view of the sensor unit according to the fifth embodiment. The sensor unit 10 according to the present embodiment includes the case main body 33 having therein a first centralized cooling portion 82 for cooling the lens 22, which is the sensor input portion, and a second centralized cooling portion 85 for cooling the camera main body 21, which is the sensor main body.

Specifically, the sensor protecting case 30 includes the first centralized cooling portion 82, which is partitioned off by a first partition 81 in the case main body 33 and constitutes an independent space within the case main body 33. The first centralized cooling portion 82 houses part of the lens 22 (in FIG. 7, the front end of the lens) that protrudes from the first partition 81 into the first centralized cooling portion 82.

The first partition 81, which defines the first centralized cooling portion 82, has the second gas inflow port 39 for causing the gas G that has entered the case main body 33 to flow into the first centralized cooling portion 82 and the second gas outflow port 40 for causing the gas G that has entered the first centralized cooling portion 82 to flow out of the first centralized cooling portion 82 to the second centralized cooling portion 85.

In the present embodiment, the first gas inflow port 37 is indirectly connected to the second gas inflow port 39 by a pipe 83. The first gas inflow port 37 may be directly connected to the second gas inflow port 39.

The sensor protecting case 30 further includes the second centralized cooling portion 85, which is partitioned off by a second partition 84 in the case main body 33 and constitutes an independent space within the case main body 33. The second centralized cooling portion 85 houses part of the camera main body 21 (in FIG. 7, a side portion of the camera main body 21) that protrudes from the second partition 84 into the second centralized cooling portion 85.

The second partition 84, which defines the second centralized cooling portion 85, has a fourth gas inflow port 86 for causing the gas G leaving the first centralized cooling portion 82 to flow into the second centralized cooling portion 85 and a fourth gas outflow port 87 for causing the gas G that has entered the second centralized cooling portion 85 to flow out of the second centralized cooling portion 85 into the case main body 33.

In the present embodiment, the second gas outflow port 40 is indirectly connected to the fourth gas inflow port 86 by a pipe 88. The second gas outflow port 40 may be directly connected to the fourth gas inflow port 86.

The gas G supplied to the sensor protecting case 30 through the first gas inflow port 37 is supplied to the first centralized cooling portion 82 through the pipe 83 and the second gas inflow port 39, thus locally cooling the lens 22, which is the sensor input portion. Then, the gas G is discharged through the second gas outflow port 40 and is supplied to the second centralized cooling portion 85 through the pipe 88 and the fourth gas inflow port 86, thus locally cooling the camera main body 21, which is the sensor main body. After that, the gas G is discharged through the fourth gas outflow port 87 into the case main body 33. The gas G further cools the camera main body 21 and the lens 22 and is then discharged from the case main body 33 to the outside through the first gas outflow port 38.

The above-described configuration enables a portion close to a welding heat source, or a portion where the amount of heat is particularly large due to radiant heat, for example, the lens 22 being the sensor input portion, to be locally cooled with the gas G and also enables the camera main body 21, which is the sensor main body, to be locally cooled. In addition, the configuration allows the camera main body 21 and the lens 22 to be further cooled with the gas G discharged into the case main body 33 after local cooling, thus effectively cooling the camera main body 21 and the lens 22.

As in the first embodiment described above, each of the first centralized cooling portion 82 and the second centralized cooling portion 85 does not necessarily need to be a hermetic space as long as the first centralized cooling portion 82 and the second centralized cooling portion 85 each constitute an independent space within the case main body 33. A hermetic space in each of the first centralized cooling portion 82 and the second centralized cooling portion 85 can further enhance the cooling effect in the portion. Each of the first centralized cooling portion 82 and the second centralized cooling portion 85 is preferably a hermetic space.

Although not illustrated, as a modification of the sensor unit 10 according to the fifth embodiment, the gas G supplied through the first gas inflow port 37 may be divided into two streams by using, for example, a pipe, and the streams of the gas G may be directly fed to the first centralized cooling portion 82 and the second centralized cooling portion 85.

Welding System

Figure 8:
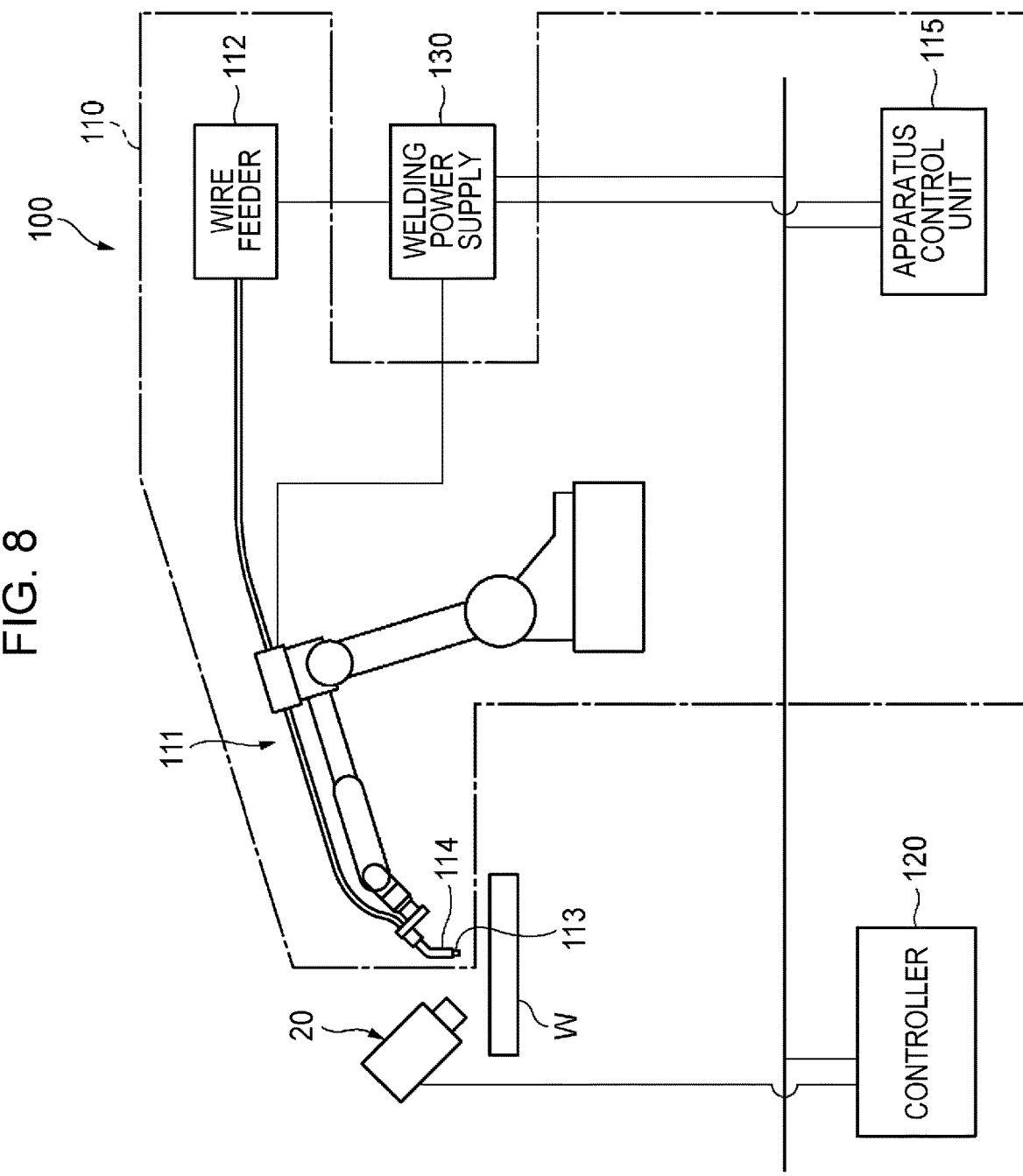
FIG. 8 is a schematic diagram of a welding system including the sensor unit.

A welding system including the above-described sensor unit 10 will be described with reference to FIG. 8. As illustrated in FIG. 8, a welding system 100 includes a welding apparatus 110, the imaging device 20, a controller 120, and a welding power supply 130.

The welding apparatus 110 includes a welding robot 111, a wire feeder 112, a welding torch 114 to which welding wire 113 is fed from the wire feeder 112, and an apparatus control unit 115. The welding apparatus 110 controls, for example, operations of parts of the welding robot 111 and a wire feed speed, in response to instructions from the apparatus control unit 115, and welds a workpiece W. The welding robot 111 includes all types of welding robots, such as a six-axis robot, a portable welding robot, and a special-purpose robot.

As described above in the first embodiment, the imaging device 20 includes the camera main body 21 and the lens 22, which are housed in the sensor protecting case 30. The imaging device 20 is cooled with the gas G supplied to the sensor protecting case 30 from the gas supply mechanism 60 (refer to FIG. 3) including the vortex cooler 62, which is the gas cooling device. The sensor protecting case 30 further includes a temperature sensor (not illustrated) for measuring the temperature of the imaging device 20. The temperature sensor measures the temperature of at least one of a rear surface of the lens 22, a side face of the lens 22, or the camera main body 21, and outputs temperature information on the temperature to the controller 120.

The imaging device 20 is disposed near the welding torch 114 of the welding apparatus 110, and outputs various pieces of welding information, such as data on captured images and information on the temperatures of parts of the imaging device 20, to the controller 120.

The controller 120 outputs instruction signals based on the various pieces of welding information obtained from the imaging device 20 to, for example, the apparatus control unit 115 and the welding power supply 130. The controller 120 further includes a temperature control unit (not illustrated). The temperature control unit performs a sensor temperature control process based on the temperature information inputted from the temperature sensor, thereby controlling cooling information on the gas G, such as a gas flow rate and a gas temperature. Or alternatively, in response to determining that the temperature information inputted from the temperature sensor exceeds a predetermined threshold value, the temperature control unit performs a temperature management process to generate an alarm.

As described above, the cooling information on the gas is controlled based on the temperature information on the temperature of the sensor measured by the temperature sensor. Or alternatively, if it is determined that the temperature information exceeds the predetermined threshold value, an alarm is generated. Thus, the sensor can be maintained at an appropriate temperature.

The welding power supply 130 supplies power to the welding wire 113 and the workpiece W in response to an instruction from the apparatus control unit 115, thus generating an arc between the welding wire 113 and the workpiece W.

The present invention is not limited to the above-described embodiments, and can be appropriately altered, modified, or improved. For example, in the present invention, the imaging device used as a sensor has been described as an example. The sensor is not limited to this example. The sensor may be a laser device that determines a condition of a workpiece, the shape of the workpiece, or a distance from a detection unit to the workpiece W with a laser beam.

As described above, the following matters are disclosed herein.

(1) A sensor protecting case capable of housing a sensor that is used for observing a weld condition or for controlling welding and that includes a sensor main body and a sensor input portion, the sensor protecting case including:

a case main body for housing the sensor main body and the sensor input portion; and a centralized cooling portion that is partitioned off by a partition so as to include at least part of the sensor input portion and constitutes an independent space within the case main body, the case main body having at least one first gas inflow port for causing gas to flow into the case main body and at least one first gas outflow port for causing the gas to flow out of the case main body, the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body.

Such a configuration enables a portion close to a welding heat source, or a portion where the amount of heat is particularly large due to radiant heat, for example, the sensor input portion, to be locally cooled with the gas and also enables the sensor main body to be effectively cooled.

(2) The sensor protecting case according to (1), wherein
the first gas outflow port and the second gas outflow port are arranged such that an ejection direction of the gas at the second gas outflow port is substantially aligned with an ejection direction of the gas at the first gas outflow port, and
the sensor main body is disposed between the first gas outflow port and the second gas outflow port.

Since at least part of the sensor main body is located in the flow of the gas from the second gas outflow port to the first gas outflow port, such a configuration enables the sensor main body to be efficiently cooled.

(3) The sensor protecting case according to (1) or (2), wherein the first gas outflow port or the second gas outflow port is provided with at least one of an air filter, a fan, or a silencer.

Such a configuration promotes the flow of the gas, thus improving cooling capacity. Furthermore, the configuration can reduce noise that is generated while the gas G is flowing through the outflow port.

(4) The sensor protecting case according to any one of (1) to (3), wherein the first gas inflow port or the second gas inflow port is provided with an air filter or a dehumidifier.

Such a configuration prevents dust or moisture from entering the case main body or the centralized cooling portion, thus further improving cooling efficiency.

(5) The sensor protecting case according to any one of (1) to (4), wherein the second gas inflow port has an S1 ranging from 7.0 to 25.0 mm², the second gas outflow port has an area S2 ranging from 2.0 to 15.0 mm², and the ratio S2/S1 of the area S2 of the second gas outflow port to the area 51 of the second gas inflow port ranges from 0.30 to 1.00.

Such a configuration enables appropriate control of a flow rate or flow velocity of the gas flowing through the centralized cooling portion, thus effectively cooling a lens that is the sensor input portion and tends to increase in temperature.

(6) The sensor protecting case according to any one of (1) to (5), wherein
the case main body has a double structure in which at least one of walls included in the case main body has a gap, and
the gap is connected to the first gas inflow port and the second gas inflow port in order to cause the gas to flow through the gap.

Such a configuration provides the double structure in which a gas passage extends along a side wall of the sensor protecting case. The sensor protecting case can be cooled by causing the gas to flow through the gas passage, thus enhancing the cooling efficiency in the whole of a sensor unit.

(7) The sensor protecting case according to any one of (1) to (6), wherein the case main body further has at least one third gas inflow port for causing the gas to flow in the case main body and at least one third gas outflow port that is directly or indirectly connected to the third gas inflow port in order to cause the gas to be ejected to one of walls included in the case main body that faces the sensor input portion.

Such a configuration causes the gas to form an air curtain at the wall facing the sensor input portion, thus protecting and cooling the sensor input portion. This configuration can reduce an influence on the sensor input portion. Furthermore, the configuration can inhibit deposition of fumes and spatter on the wall facing the sensor input portion.

(8) The sensor protecting case according to (7), wherein the first gas outflow port is directly or indirectly connected to the third gas inflow port.

Such a configuration allows the gas for cooling and the gas for forming the air curtain to be reused, thus effectively using the gas.

(9) The sensor protecting case according to (7) or (8), wherein
the case main body has a double structure in which at least one of the walls included in the case main body has a gap, and
the gap is connected to the third gas inflow port and the third gas outflow port in order to cause the gas in order to flow through the gap.

Such a configuration provides the double structure in which a gas passage extends along a side wall of the sensor protecting case. The sensor protecting case can be cooled by causing the gas to flow through the gas passage, thus enhancing the cooling efficiency in the whole of the sensor unit.

(10) The sensor protecting case according to any one of (1) to (9), wherein the sensor is a visual sensor, and the sensor input portion is a lens of the visual sensor.

Such a configuration allows a weld condition to be observed as an image through the visual sensor.

(11) A sensor protecting case capable of housing a sensor that is used for observing a weld condition or for controlling welding and that includes a sensor main body and a sensor input portion, the sensor protecting case including:
a case main body for housing the sensor main body and the sensor input portion;
a first centralized cooling portion that is partitioned off by a first partition so as to include at least part of the sensor input portion and constitutes an independent space within the case main body; and
a second centralized cooling portion that is partitioned off by a second partition so as to include at least part of the sensor main body and constitutes an independent space within the case main body,
the case main body having at least one first gas inflow port for causing gas to flow into the case main body and at least one first gas outflow port for causing the gas to flow out of the case main body,
the first partition having at least one second gas inflow port that is directly or indirectly connected to the first gas inflow port in order to cause the gas to flow into the first centralized cooling portion and at least one second gas outflow port for causing the gas to flow out of the first centralized cooling portion to the second centralized cooling portion,
the second partition having at least one fourth gas inflow port that is directly or indirectly connected to the second gas outflow port in order to cause the gas to flow into the second centralized cooling portion and at least one fourth gas outflow port for causing the gas to flow out of the second centralized cooling portion into the case main body.

Such a configuration enables a portion close to a welding heat source, or a portion where the amount of heat is particularly large due to radiant heat, for example, the sensor input portion, to be locally cooled with the gas and also enables the sensor main body to be locally cooled. Furthermore, this configuration enables the sensor main body and the sensor input portion to be further cooled with the gas discharged into the case main body after local cooling. Thus, the sensor main body and the sensor input portion can be more effectively cooled.

(12) An imaging device including:
 a visual sensor that is used for observing a weld condition or for controlling welding;
 the sensor protecting case according to (10) capable of housing the visual sensor; and
 a gas cooling device configured to cool gas that is caused to flow into the sensor protecting case.

Such a configuration enables the visual sensor housed in the sensor protecting case to be cooled by causing the gas cooled through the gas cooling device to flow into the sensor protecting case.

(13) A welding system including the imaging device according to (12), a welding apparatus, a controller, and a welding power supply,
 the imaging device being disposed near a welding torch included in the welding apparatus and configured to obtain welding information,
 the welding apparatus including an apparatus control unit configured to control parts of the welding apparatus,
 the controller being configured to output the welding information inputted from the imaging device to the welding power supply and the apparatus control unit.

Such a configuration allows the welding apparatus to be controlled based on the welding information obtained from the imaging device, thus achieving high-quality welding.

(14) A sensor cooling method for cooling a sensor by using a sensor protecting case capable of housing the sensor, the sensor being used for observing a weld condition or for controlling welding and including a sensor main body and a sensor input portion,
 the sensor protecting case including
  a case main body for housing the sensor main body and the sensor input portion, and
  a centralized cooling portion that is partitioned off by a partition so as to include at least part of the sensor input portion and constitutes an independent space within the case main body,
 the case main body having at least one first gas inflow port for causing gas to flow into the case main body and at least one first gas outflow port for causing the gas to flow out of the case main body,
 the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body,
 the method including:
  causing a total flow rate of the gas supplied to the first gas inflow port to range from 100 to 200 L/min.

Such a configuration provides a sufficient effect of suppressing an increase in temperature, thus efficiently cooling the sensor main body and the sensor input portion.

(15) The sensor cooling method according to (14), wherein
 the case main body further has at least one third gas inflow port for causing the gas to flow into the case main body and at least one third gas outflow port that is directly or indirectly connected to the third gas inflow port in order to cause the gas to be ejected to one of walls included in the case main body that faces the sensor input portion, and
 the method further includes causing the total flow rate of the gas supplied to the third gas inflow port to range from 100 to 200 L/min.

Such a configuration provides an air curtain, thus effectively protecting the wall facing the sensor input portion. This configuration also provides the sufficient effect of suppressing an increase in temperature, thus reducing the influence of radiant heat on the sensor input portion.

(16) A sensor cooling control method for cooling a sensor by using a sensor protecting case capable of housing the sensor and a controller including a temperature control unit, the sensor being used for observing a weld condition or for controlling welding and including a sensor main body and a sensor input portion,
 the sensor protecting case including
  a case main body for housing the sensor main body and the sensor input portion,
  a centralized cooling portion that is partitioned off by a partition so as to include at least part of the sensor input portion and constitutes an independent space within the case main body, and
  a temperature sensor configured to measure a temperature of the sensor,
 the case main body having at least one first gas inflow port for causing gas to flow into the case main body and at least one first gas outflow port for causing the gas to flow out of the case main body,
 the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body,
 the temperature control unit being configured to receive temperature information on the temperature of the sensor measured by the temperature sensor,
 the method including:
  a sensor temperature control step of controlling, through the temperature control unit, cooling information on the gas based on the temperature information; and
  a temperature management step of generating, through the temperature control unit, an alarm in response to the temperature control unit determining that the temperature information exceeds a predetermined threshold value,
 wherein the sensor temperature control step or the temperature management step is performed after the temperature control unit receives the temperature information.

Such a configuration allows the cooling information on the gas to be controlled based on the temperature information on the temperature of the sensor measured by the temperature sensor, or alternatively, allows an alarm to be generated in response to a determination that the temperature information exceeds the predetermined threshold value. Thus, the sensor can be maintained at an appropriate temperature.

(17) The sensor cooling control method according to (16), wherein
the sensor is a visual sensor,
the sensor input portion is a lens of the visual sensor, and
the temperature sensor measures a temperature of at least one of a rear surface of the lens, a side face of the lens, or the sensor main body.

Such a configuration enables the lens and the sensor main body to be maintained at an appropriate temperature.

(18) The sensor cooling control method according to (16) or (17), wherein the cooling information includes at least one of a gas flow rate or gas temperature of the gas.

Such a configuration enables the sensor to be efficiently cooled.

Various embodiments have been described above with reference to the drawings. Needless to say, the present invention is not limited to the embodiments. It will be apparent to those skilled in the art that various alterations and modifications can be made within the scope of the present invention as set forth in the appended claims. It will be understood that these alterations and modifications naturally fall within the technical scope of the present invention. Furthermore, any combination of the components in the above-described embodiments may be made without departing from the spirit and scope of the invention.

The present application is based on Japanese Patent Application No. 2020-168540 filed on Oct. 5, 2020, which is hereby incorporated by reference herein in its entirety.

REFERENCE SIGNS LIST 10 sensor unit
20 imaging device (sensor, visual sensor)
21 camera main body (sensor main body)
22 lens (sensor input portion)
30 sensor protecting case
33 case main body
34 partition
35 centralized cooling portion
37 first gas inflow port
38 first gas outflow port
39 second gas inflow port
40 second gas outflow port
60 gas supply mechanism
61 air filter
62 vortex cooler (gas cooling device)
63 silencer
71 third gas inflow port
72 third gas outflow port
73 connection path
81 first partition
82 first centralized cooling portion
84 second partition
85 second centralized cooling portion
86 fourth gas inflow port
87 fourth gas outflow port
100 welding system
110 welding apparatus
111 welding robot
114 welding torch
115 apparatus control unit
120 controller
130 welding power supply
C gap
G gas

The invention claimed is:

1. A sensor protecting case configured to house a sensor that is used for observing a weld condition or for controlling welding and that includes a sensor main body and a sensor input portion, the sensor protecting case comprising:
a case main body for housing the sensor main body and the sensor input portion; and
a centralized cooling portion that is partitioned off by a partition so as to include at least part of the sensor input portion and constitutes an independent space within the case main body, wherein
the case main body has at least one first gas inflow port for causing gas to flow into the case main body and at least one first gas outflow port for causing the gas to flow out of the case main body, and
the partition has at least one second gas inflow port that is directly or indirectly connected to the first gas inflow port in order to cause the gas to flow into the centralized cooling portion and at least one second gas outflow port for causing the gas to flow out of the centralized cooling portion into the case main body.

2. The sensor protecting case according to claim 1, wherein
the first gas outflow port and the second gas outflow port are arranged such that an ejection direction of the gas at the second gas outflow port is substantially aligned with an ejection direction of the gas at the first gas outflow port, and
the sensor main body is disposed between the first gas outflow port and the second gas outflow port.

3. The sensor protecting case according to claim 1, wherein the first gas outflow port or the second gas outflow port is provided with at least one of an air filter, a fan, or a silencer.

4. The sensor protecting case according to claim 1, wherein the first gas inflow port or the second gas inflow port is provided with an air filter or a dehumidifier.

5. The sensor protecting case according to claim 1, wherein
the second gas inflow port has an area ranging from 7.0 to 25.0 mm2,
the second gas outflow port has an area ranging from 2.0 to 15.0 mm2, and
a ratio of the area of the second gas outflow port to the area of the second gas inflow port ranges from 0.30 to 1.00.

6. The sensor protecting case according to claim 1, wherein
the case main body has a double structure in which at least one of walls included in the case main body has a gap, and
the gap is connected to the first gas inflow port and the second gas inflow port in order to cause the gas to flow through the gap.

7. The sensor protecting case according to claim 6, wherein the case main body further has at least one third gas inflow port for causing the gas to flow into the case main body and at least one third gas outflow port that is directly or indirectly connected to the third gas inflow port in order to cause the gas to be ejected to one of the walls included in the case main body that faces the sensor input portion.

8. The sensor protecting case according to claim 7, wherein the first gas outflow port is directly or indirectly connected to the third gas inflow port.

9. The sensor protecting case according to claim 8, wherein the case main body has a double structure in which at least one of the walls included in the case main body has a gap, and the gap is connected to the third gas inflow port and the third gas outflow port in order to cause the gas to flow through the gap.

10. The sensor protecting case according to claim 7, wherein the gap is connected to the third gas inflow port and the third gas outflow port in order to cause the gas to flow through the gap.

11. The sensor protecting case according to claim 1, wherein the case main body further has at least one third gas inflow port for causing the gas to flow into the case main body and at least one third gas outflow port that is directly or indirectly connected to the third gas inflow port in order to cause the gas to be ejected to one of walls included in the case main body that faces the sensor input portion.

12. The sensor protecting case according to claim 11, wherein the first gas outflow port is directly or indirectly connected to the third gas inflow port.

13. The sensor protecting case according to claim 12, wherein the case main body has a double structure in which at least one of the walls included in the case main body has a gap, and the gap is connected to the third gas inflow port and the third gas outflow port in order to cause the gas to flow through the gap.

14. The sensor protecting case according to claim 11, wherein the case main body has a double structure in which at least one of the walls included in the case main body has a gap, and the gap is connected to the third gas inflow port and the third gas outflow port in order to cause the gas to flow through the gap.

15. The sensor protecting case according to claim 1, wherein the sensor is a visual sensor, and the sensor input portion is a lens of the visual sensor.

16. An imaging device comprising:

a visual sensor configured to observe a weld condition or to control welding;

the sensor protecting case according to claim 15 configured to house the visual sensor; and a gas cooling device configured to cool gas that is caused to flow into the sensor protecting case.

17. A welding system comprising the imaging device according to claim 16, a welding apparatus, a controller, and a welding power supply, the imaging device being disposed near a welding torch included in the welding apparatus and configured to obtain welding information, the welding apparatus including an apparatus control unit configured to control parts of the welding apparatus, and the controller being configured to output the welding information inputted from the imaging device to the welding power supply and the apparatus control unit.

18. A sensor protecting case configured to house a sensor configured to observe a weld condition or to control welding and that includes a sensor main body and a sensor input portion, the sensor protecting case comprising:

a case main body for housing the sensor main body and the sensor input portion;

a first centralized cooling portion that is partitioned off by a first partition so as to include at least part of the sensor input portion and constitutes an independent space within the case main body; and a second centralized cooling portion that is partitioned off by a second partition so as to include at least part of the sensor main body and constitutes an independent space within the case main body, wherein the case main body has at least one first gas inflow port for causing gas to flow into the case main body and at least one first gas outflow port for causing the gas to flow out of the case main body, the first partition has at least one second gas inflow port that is directly or indirectly connected to the first gas inflow port in order to cause the gas to flow into the first centralized cooling portion and at least one second gas outflow port for causing the gas to flow out of the first centralized cooling portion to the second centralized cooling portion, and the second partition has at least one fourth gas inflow port that is directly or indirectly connected to the second gas outflow port in order to cause the gas to flow into the second centralized cooling portion and at least one fourth gas outflow port for causing the gas to flow out of the second centralized cooling portion into the case main body.

19. A sensor cooling method for cooling a sensor by using a sensor protecting case configured to house the sensor, the sensor being configured to a weld condition or to control welding and including a sensor main body and a sensor input portion, the sensor protecting case including a case main body for housing the sensor main body and the sensor input portion, and a centralized cooling portion that is partitioned off by a partition so as to include at least part of the sensor input portion and constitutes an independent space within the case main body, the case main body having at least one first gas inflow port for causing gas to flow into the case main body and at least one first gas outflow port for causing the gas to flow out of the case main body, and the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body, the method comprising:

causing a total flow rate of the gas supplied to the first gas inflow port to range from 100 to 200 L/min.

20. The sensor cooling method according to claim 19, wherein the case main body further has at least one third gas inflow port for causing the gas to flow into the case main body and at least one third gas outflow port that is directly or indirectly connected to the third gas inflow port in order to cause the gas to be ejected to one of walls included in the case main body that faces the sensor input portion, and the method further includes causing a total flow rate of the gas supplied to the third gas inflow port to range from 100 to 200 L/min.

21. A sensor cooling control method for cooling a sensor by using a sensor protecting case configured to house the sensor and a controller including a temperature control unit, the sensor being configured to observe a weld condition or to control welding and including a sensor main body and a sensor input portion, the sensor protecting case including
- a case main body for housing the sensor main body and the sensor input portion,
- a centralized cooling portion that is partitioned off by a partition so as to include at least part of the sensor input portion and constitutes an independent space within the case main body, and
- a temperature sensor configured to measure a temperature of the sensor, the case main body having at least one first gas inflow port for causing gas to flow into the case main body and at least one first gas outflow port for causing the gas to flow out of the case main body, the partition having at least one second gas inflow port that is directly or indirectly connected to the first gas inflow port in order to cause the gas to flow into the centralized cooling portion and at least one second gas outflow port for causing the gas to flow out of the centralized cooling portion into the case main body, the temperature control unit being configured to receive temperature information on the temperature of the sensor measured by the temperature sensor, the method comprising:
- controlling, through the temperature control unit, cooling information on the gas based on the temperature information; and
- generating, through the temperature control unit, an alarm in response to the temperature control unit determining that the temperature information exceeds a predetermined threshold value,
- wherein the controlling or the generating is performed after the temperature control unit receives the temperature information.

22. The sensor cooling control method according to claim 21, wherein
- the sensor is a visual sensor,
- the sensor input portion is a lens of the visual sensor, and
- the temperature sensor measures a temperature of at least one of a rear surface of the lens, a side face of the lens, or the sensor main body.

23. The sensor cooling control method according to claim 21, wherein the cooling information includes at least one of a gas flow rate or gas temperature of the gas.

* * * * *